United States Patent
Kawai et al.

(10) Patent No.: US 7,496,100 B2
(45) Date of Patent: Feb. 24, 2009

(54) METHOD AND APPARATUS FOR SYNCHRONOUS FRAME COMMUNICATION

(75) Inventors: Kenji Kawai, Yokosuka (JP); Osamu Ishida, Tokyo (JP); Haruhiko Ichino, Yokosuka (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 1154 days.

(21) Appl. No.: 10/258,009

(22) PCT Filed: Apr. 17, 2001

(86) PCT No.: PCT/JP01/03273

§ 371 (c)(1),
(2), (4) Date: Oct. 17, 2002

(87) PCT Pub. No.: WO01/80469

PCT Pub. Date: Oct. 25, 2001

(65) Prior Publication Data

US 2003/0105990 A1    Jun. 5, 2003

(30) Foreign Application Priority Data

Apr. 18, 2000   (JP) .............................. 2000-117026
Apr. 18, 2000   (JP) .............................. 2000-117027

(51) Int. Cl.
*H04L 12/28*   (2006.01)
*H04L 12/56*   (2006.01)

(52) U.S. Cl. .................... 370/395.5; 370/230; 370/231; 370/235; 370/386; 370/388

(58) Field of Classification Search ................ None
See application file for complete search history.

(56) References Cited

U.S. PATENT DOCUMENTS 4,486,739 A       12/1984   Franaszek et al. ............ 340/347
6,269,081 B1 *   7/2001    Chow et al. .................. 370/241

FOREIGN PATENT DOCUMENTS

JP          3112240 A1      5/1991
JP          5336045 A1     12/1993
JP       2000151607 A1      5/2000

* cited by examiner

*Primary Examiner*—Edan Orgad
*Assistant Examiner*—Blanche Wong
(74) *Attorney, Agent, or Firm*—Darby & Darby PC

(57) ABSTRACT

A method and apparatus for synchronous frame communication first communicates a frame signal having communication data and first control information having a bit length and an SDH frame structure in a part of frame time interval and a control information processing method based on an SDH-frame-overhead-process for processing the first control information that includes bytes indicative of each of a relay node's section overhead, an end terminal section overhead, and at least a part of a byte of higher path's overhead. In the frame time interval a signal is communicated by a different second communicating method having the communication data and second control information having a bit length capable of including a significantly higher amount of information than that of the first control information and which corresponds to the first control information byte communicated in the frame time interval.

8 Claims, 11 Drawing Sheets

METHOD AND APPARATUS FOR SYNCHRONOUS FRAME COMMUNICATION

TECHNICAL FIELD

The present invention relates to a communicating method. In particular, the present invention relates to a disturbance monitoring method and its operation in high-speed digital communication.

BACKGROUND ART

In a communication system for relaying and transmitting a signal which is transmitted from a transmitting node by a relay node and receiving it by a receiving node, there are conventional techniques for monitoring a transmission line disturbance such as a code error and a transmission line fault as follows.

Figure 10:
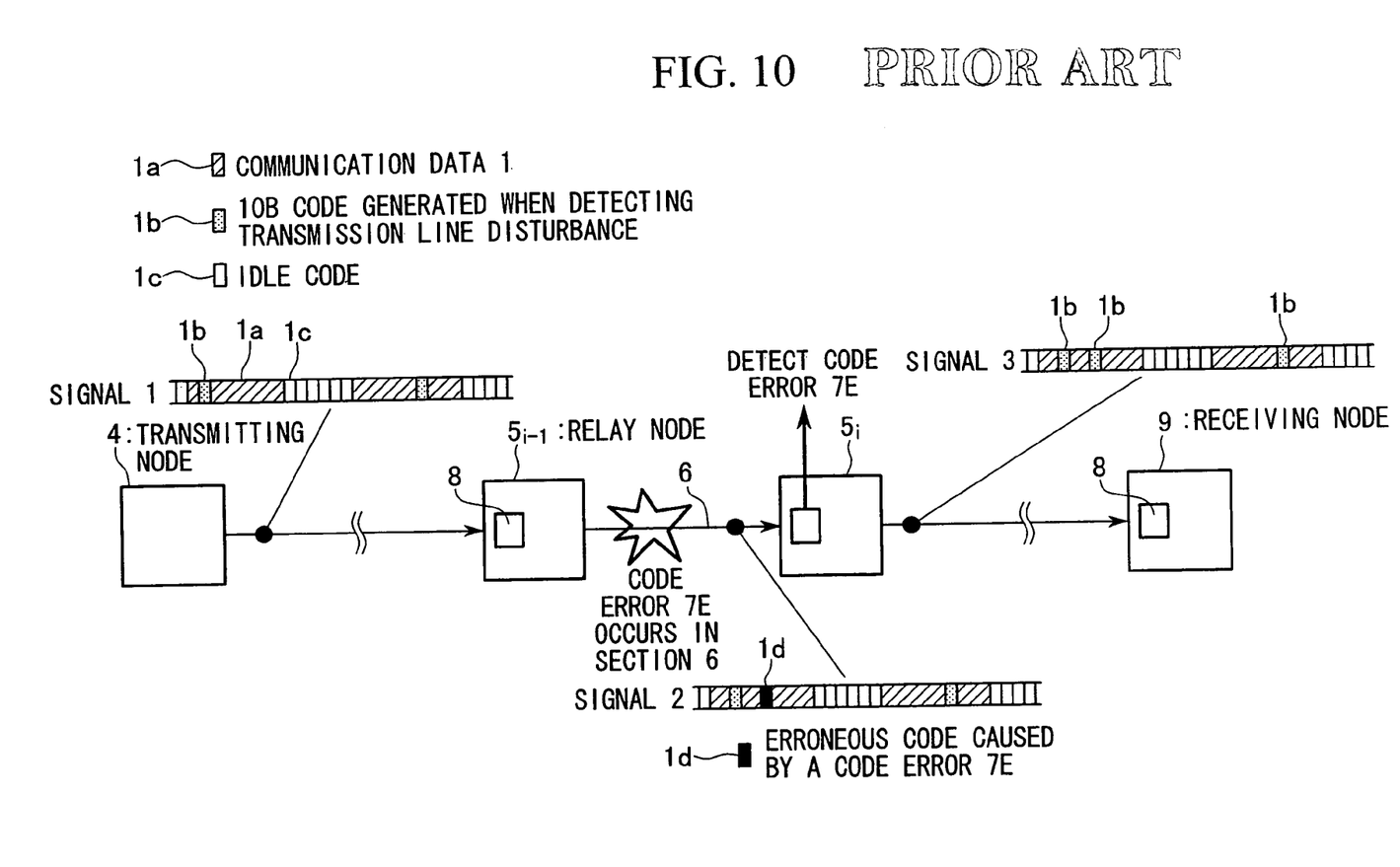
FIG. 10 is a block diagram showing a monitoring method which is employed in a conventional communication system.

FIG. 10 is a block diagram showing a conventional monitoring method for a communication system.

In FIG. 10, the communication system comprises a transmitting node 4, M pieces (M is an integer) of relay node $5_1$ to $5_M$ (relay nodes $5_{i-1}$ to $5_i$ are shown in FIG. 10), a receiving node 9, and a transmission line. In each of the relay node $5_1$ to $5_M$ and the receiving node 9, a transmission disturbance detecting section 8 is disposed respectively.

The transmitting node 4 transmits a signal 1. The signal 1 is relayed and transmitted by each of the relay node $5_1$ to $5_M$ successively, and is received by a receiving node 9.

The signal 1 contains a communication data 1a which is converted to a 10B code according to an 8B/10B encoding method which is publically known, a 10B (bit) code 1b instead of an errored code, and an idle code 1c which is transmitted during a period in which the communication data 1 is not transmitted. The 8B/10B encoding method is disclosed in publically known documents such as Japanese Unexamined Patent Application, First Publication No. Sho 59-10056.

When there is an error in the communication data 1a encoded by 8B/10B encoding method, each of the relay nodes detects these errors as a code error by a transmission disturbance detecting section 8, andrewrites the errored code to the 10B code according to the 8B/10B encoding method so as to be transmitted to the downstream thereof. Suppose a code error 7E occurs in a section 6 between relay nodes $5_{i-1}$ to $5_i$, a signal 2 having the code error 7E is received at the relay node $5_i$. The signal 2 contains an errored code 1d which is caused by the code error 7E.

The relay node $5_i$ detects the errored code 1d by the transmission disturbance detecting section 8 and rewrites the code 1d to a 10B code 1b which is according to the 8B/10B encoding method and regards a signal containing the 10B code 1b as a signal 3 so as to be transmitted downstream thereof. The signal 3 is received at a receiving node 9 unless a code error occurs thereafter. Therefore, the 10B code 1b in the signal 3 contains an error signal due to the code error 7E.

Also, each of the relay nodes detects abnormal receipt of the signals as a transmission line fault by the transmission disturbance detecting section 8 and generates a signal which refers to the 8B/10B encoding method during a period of the transmission line fault and transmits it to the downstream thereof. Here, "downstream" indicates a recipient of transmitted information. Also, "transmit" is defined as an occurrence of information transmission.

In the monitoring method for the above-mentioned conventional communication system, it is possible to detect a transmission disturbance only in a section between the transmitting node and the relay node and in a section between the relay nodes. Thus, it was a problem in that a transmission line disturbance could not be detected by observing only the signal 3 in the receiving node.

In order to make use of the monitoring information such as a code error and a transmission line fault for a purpose of maintaining the communication system, it was necessary to collect the monitoring information such as a code error and a transmission line fault sent from each of the relay nodes via another communication system so as to transmit the monitoring information to a receiving node. However, setting up such an extra communication system increases the cost for the overall communication system. Therefore, there was a problem in that the monitoring information such as a code error and a transmission line fault cannot be managed desirably in the conventional communication system.

A first object of the present invention is to realize a monitoring method for a communication in which the transmission line disturbance such as a code error and a transmission line fault which occur between the transmitting node and the receiving node can be detected at the receiving node even if a data communication is operated via relay nodes.

Also, an operation of an integrated network containing a communication system having a different communicating method from that of a currently-used synchronous communication system was conventionally performed as follows.

Figure 11:
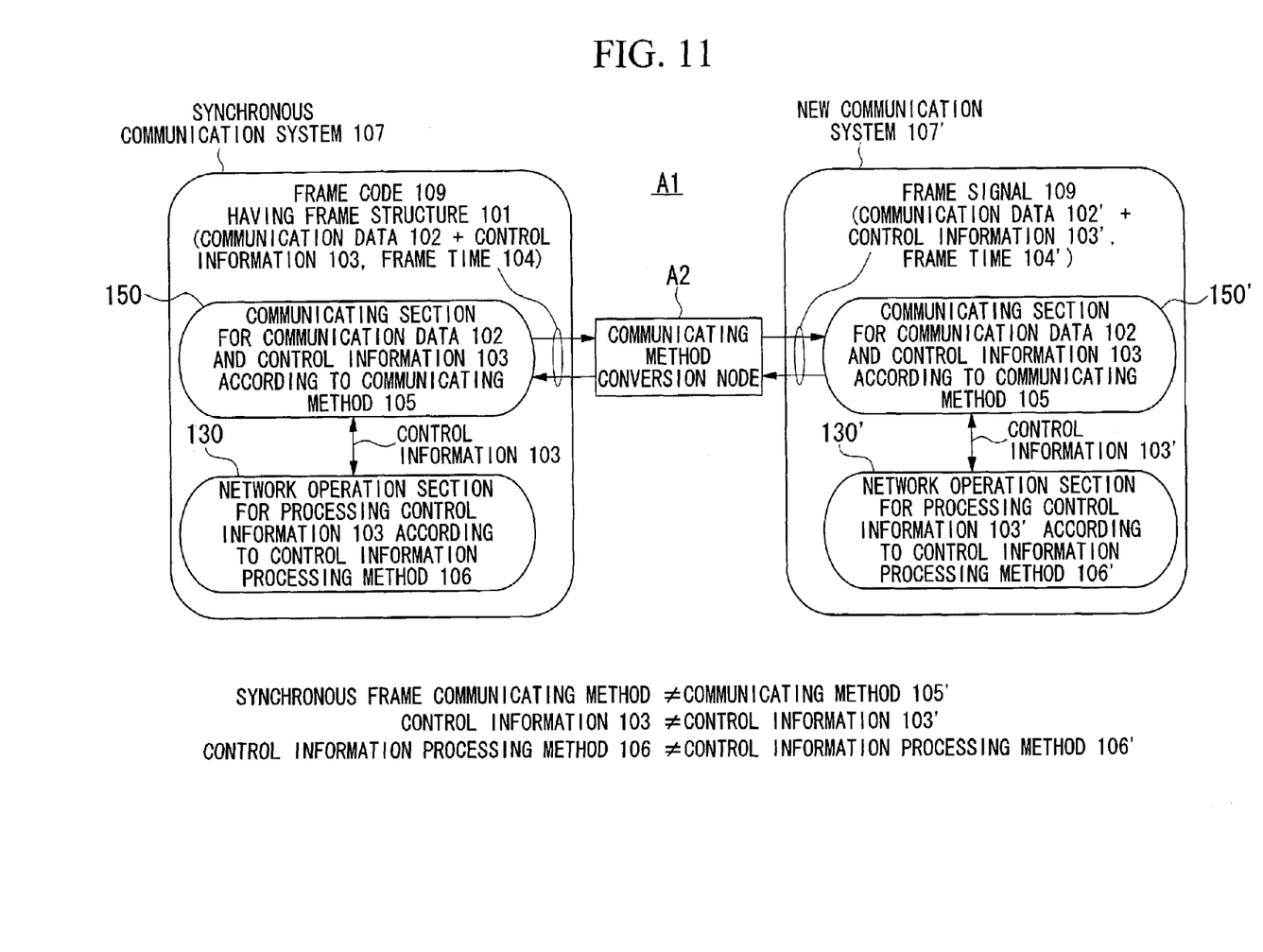
FIG. 11 is a block diagram showing a structure of a conventional integrated network.

FIG. 11 is a connecting scheme of an integrated network A1 in which a currently used synchronous communication system 107 and a new communication system 107' having a different communicating method from that of the currently-used synchronous communication system 107 are connected according to a conventional technique.

The integrated network A1 contains a synchronous communication system 107, a new communication system 107', and a communicating method converting node A2 for connecting the synchronous communication system 107 and the new communication system 107'.

The synchronous communication system 107 contains a communicating section 150 for performing communication according to a synchronous frame communicating method 105 having a predetermined frame structure 101 and operating a transmission and receipt of a frame signal 109 containing a control information 103 having n (n is an integer) bit length for maintaining the communication data 102 and the communication system at a predetermined interval of frame time 104 in a successive manner and a network operation section 130 which is operated according to a control information processing method 106 for processing the control information 103 which is used to maintain the communication system.

The new communication system 107' contains a communication section 150' in which a signal 109' containing a communication data 102' and a control information 103' having at least N (N is an integer larger than n) bit length can be communicated according to a communicating method 105' which is different from the synchronous frame communicating method 105 during a frame time 104 according to a communicating method 105' and a network operation section 130' which is according to a control information processing method 106' for performing a processing of the control information 103' which is used for maintaining the communication system.

The control information processing method 106' in the new communication system 107' in the integrated network A1 is different from the control information processing method 106 in the currently-used synchronous communication system 107. Therefore, it was necessary to develop new software for realizing the control information processing method 106' for implementing the new communication system 107'.

Also, in the integrated network A1, network operation is performed both by the control information processing method 106 for the synchronous communication system 107 and the control information processing method 106' for the new communication system 107'.

Thus, there was a possibility that the cost of the hardware in the integrated network A1 could be reduced by introducing the new communication system 107'. However, because development of a new software for realizing the control information processing method 106' must accompany a cost increase, it was a problem in that the integrated network cannot be realized economically.

Also, there was no operation service provider who can guarantee the quality of the signal which is transmitted by both of the synchronous communication system 107 and the new communication system 107' between the transmitting node and the receiving node. Thus it was a problem in that no one can provide a quality-guaranteed service.

A second object of the present invention is to provide a communication system such that the new software for realizing the control information processing method 106' is developed by utilizing the control information processing method which is adopted in the currently-used synchronous communication system so as to realize network operation in a seamless manner in the integrated network containing the currently used synchronous communication system and the new communication system.

DISCLOSURE OF INVENTION

In a first aspect of the present invention, a monitoring method for a communication system for relaying signals which are transmitted from a transmitting node by one or more relay nodes successively and the receiving thereof by a receiving node is characterized in that:

each of the relay nodes add a first monitoring information which indicates no disturbance or a second monitoring information which indicates an occurrence of a transmission line disturbance to the received signals at a predetermined timing and transmit this to a downstream;

each of the relay nodes transmit the second monitoring information when the transmission line disturbance is detected between the monitoring information which was transmitted previously and the monitoring information which is supposed to be transmitted; and each of the relay nodes transmit the first monitoring information when the transmission line disturbance is not detected.

By doing this, it is possible to transmit the monitoring information easily from each of the relay nodes periodically; therefore, it is possible to realize hardware for the relay node.

In a second aspect of the present invention, a monitoring method for a communication system for relaying signals which are sent from a transmitting node by one or more relay nodes successively and receiving thereof by a receiving node is characterized in that:

a transmitting node adds a monitoring information which indicates no disturbance to a signal which is supposed to be sent at a predetermined timing and is transmitte;

each of the relay nodes stops transmitting all the monitoring information that are received when the each node is detecting the transmission line defect and adds the monitoring information which indicates the occurrence of the transmission line fault at a predetermined timing and transmits this downstream; and each of the relay nodes replaces the monitoring information which is received after the relay node detects the code error and indicates no disturbance with monitoring information which indicates a code error and transmits this downstream.

By utilizing such features, each node rewrites the monitoring information which is sent from upstream, or transmits substitute information instead of transmitting it downstream. By doing this, the transmitted amount of the monitoring information is maintained at a constant level even if the number of relay nodes increases. By applying the present invention to a communication system in which there is a limit on the amount of transmitting monitoring information, it is possible to realize a flexible communication system which does not need to limit the number of the relay nodes.

In a third aspect of the present invention, a communicating method for a communication system which uses a synchronous frame communicating method as a first communication method for communicating a frame signal having a communication data and a first control information having n (n is an integer) bit length and a predetermined frame structure in a predetermined frame time interval and a control information processing method for processing the first control information is characterized in that:

a signal having the communication data and a second control information having N (>n) bit length is communicated by using the second communicating method which is different from the first communicating method in the predetermined frame time interval; and the second control information containing the first control information is communicated in the predetermined frame time interval.

By using such a communicating method, a control information which is necessary for a control information processing method in the currently used synchronous communication system transmitted by a virtual frame which is equivalent to a frame of the currently used synchronous communication system. Therefore, it is possible to employ the control information processing method in the currently used synchronous communication system without modification.

Furthermore, in such an integrated network in which a currently used synchronous communication system and a communication system to which the communicating method according to the present invention is applied are combined, it is possible to unify the control information processing method. Therefore, it is possible to operate an integrated network as smoothly as the operation of the network system which contains only currently used synchronous communication system.

BEST MODE FOR CARRYING OUT THE INVENTION

Embodiments according to the present invention are explained with reference to drawings as follows.

Figure 1:
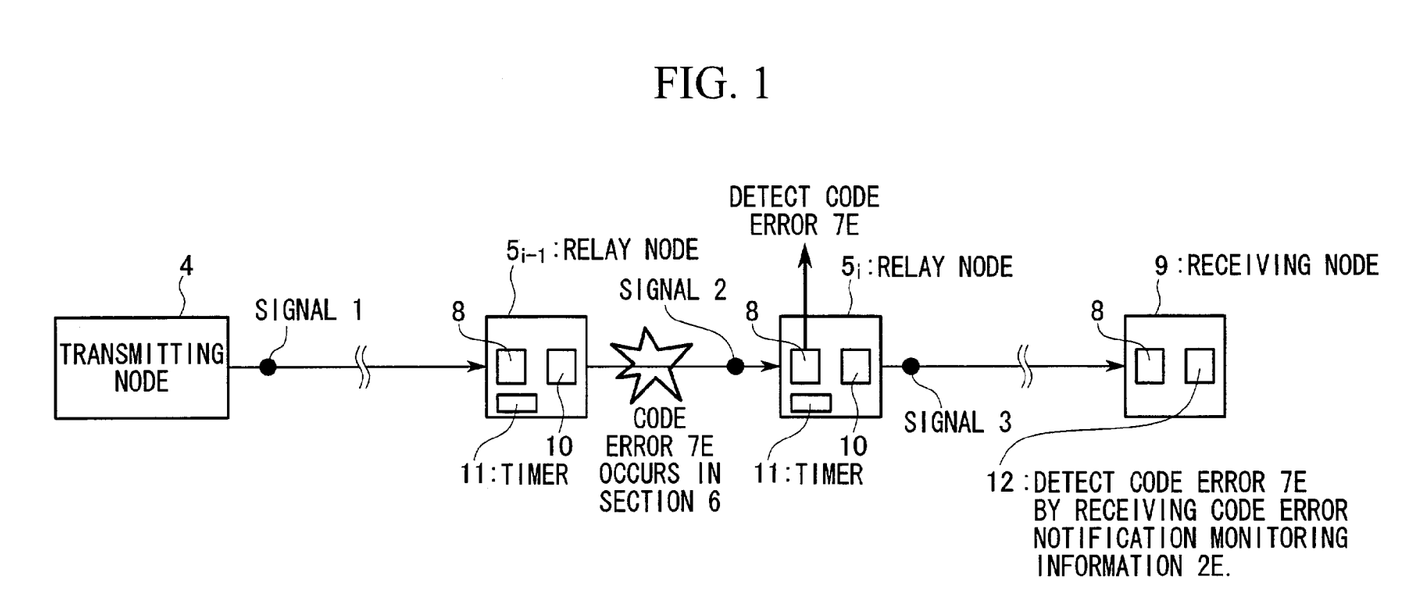
FIG. 1 is a block diagram of a monitoring method for a communication system according to a first embodiment of the present invention in which a code error occurs.

FIG. 1 is a block diagram showing a monitoring method which is employed in a communication system according to a first embodiment of the present invention. Hereinafter, the same reference numerals are applied to corresponding members as shown in FIG. 10 so as to omit the repeated explanation thereof.

In FIG. 1, each of the relay node $5_1$ to $5_M$ is provided with a monitoring information transmitting section 10 and a timer 11. Also, a receiving node 9 is provided with a monitoring information receiving section 12. An operation in which a signal 1 which is transmitted from a transmitting node 4 is relayed by relay node $5_1$ to $5_M$ until received at a receiving node 9 is the same as an operation shown in FIG. 10.

Figure 2:
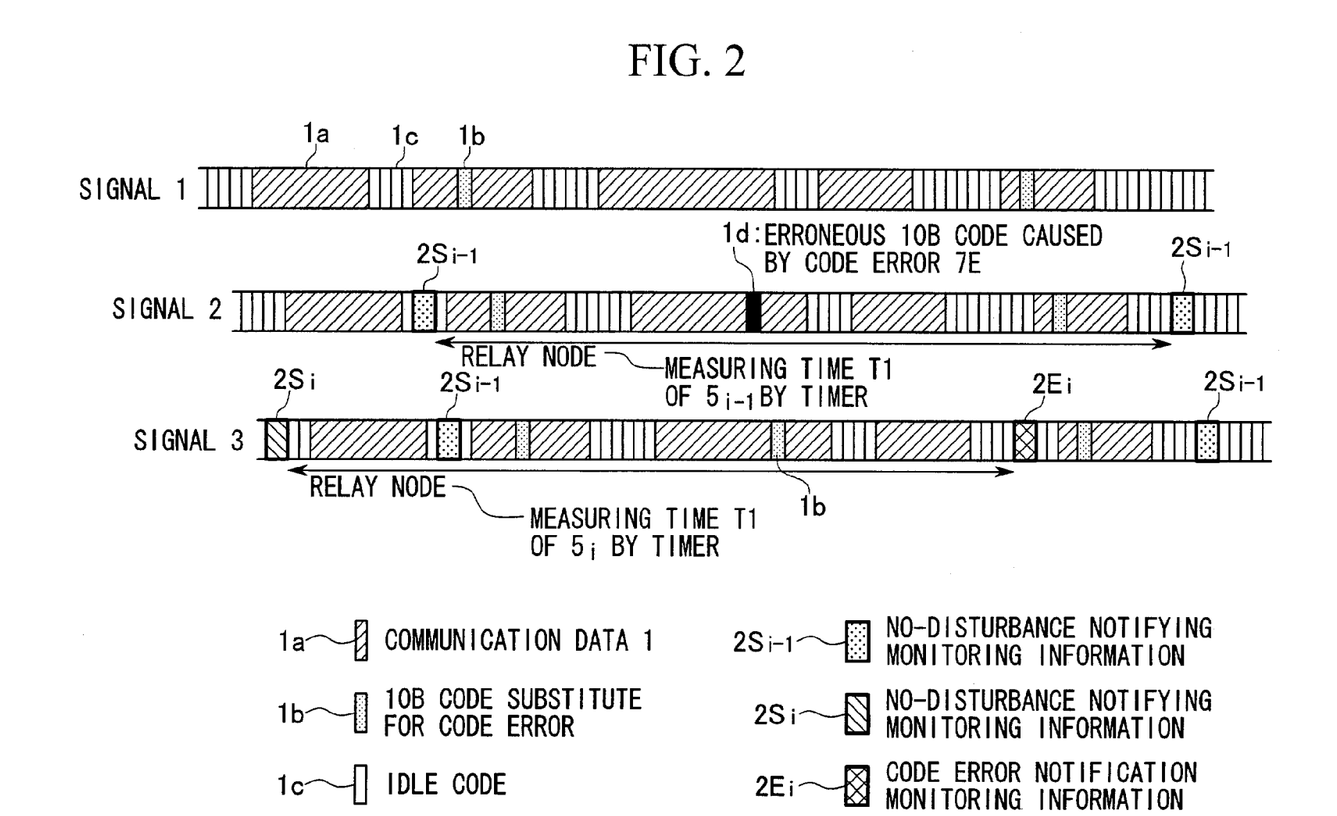
FIG. 2 is a timing chart showing an operation of a communication system to a code error by a monitoring method according to a first embodiment of the present invention monitoring method.

In the present embodiment, as shown in FIG. 2, each of the relay nodes adds a monitoring information such as no disturbance notification monitoring information 2S or a code error notification monitoring information 2E which are transmitted from the monitoring information transmitting section 10 to a received signal at every period of time T1 which is kept by a timer 11 so as to transmit it downstream. The no disturbance notification monitoring information 2S and the code error notification monitoring information 2E are generated by replacing a portion of an idle code 1c as shown in the drawing.

Next, an operation in a case in which a code error 7E occurs in a section 6 between relay node $5_1$ to $5_M$ shown in FIG. 1 is explained with reference to FIG. 2.

The relay nodes $5_{i-1}$ transmit a signal 2 containing a signal 1 which is received from a transmitting node 4 to which a no disturbance notification monitoring information $2S_{i-1}$ is added at every period of time T1 to a relay node $5_i$. Accordingly, when a code error 7E occurs in the section 6, the signal 2 contains an erroneous code 1d caused by the code error 7E.

A relay node $5_i$ adds a no disturbance notification monitoring information $2S_i$ to the received signal 2 at every period of time T1. When an erroneous code 1d is detected during the time T1, the relay node $5_i$ adds the code error notification monitoring information $2E_i$ after the time T1 passes. The signal to which the no disturbance notification monitoring information $2S_i$ and the code error notification monitoring information $2E_i$ are added becomes a signal 3 so as to be received at the receiving node 9. Therefore, the monitoring information which is transmitted from the relay node $5_i$ contains a condition of a transmission line disturbance which is detected by the relay node $5_i$ between the previous transmission and the currently operated transmission.

Here, each of the relay nodes relays the monitoring information which is received upstream to downstream without change.

Accordingly, the receiving node 9 detects the no disturbance notification monitoring information 2S, code error notification monitoring information 2E, and the 10B code 1b in the received signal 3 by using the monitoring information receiving section 12 and investigates a relationship of the above-mentioned information and code so as to determine a condition of code error in the transmission line.

Also, when a transmission line fault occurs in the section 6, the relay node $5_i$ transmits a transmission line fault notification monitoring information 2D (not shown in the drawing) which indicates a transmission line fault to the downstream during a period of transmission line fault at every period of time T1.

Accordingly, the receiving node 9 detects the transmission line fault notification monitoring information 2D in the received signal 3 by using the monitoring information receiving section 12 and investigates a relationship of the above-mentioned information so as to determine a condition of transmission line fault in the transmission line.

According to the present embodiment, it is possible to determine a condition of the transmission line disturbance such as code error and transmission line fault in a transmission line between the transmitting node 4 and the receiving node 9.

Also, the present embodiment requires only that a function for transmitting a monitoring information which indicates a transmission line disturbance which is detected at the relay node to downstream periodically be added to the relay node. Therefore, it is possible to simplify the hardware of the relay node.

Figure 3:
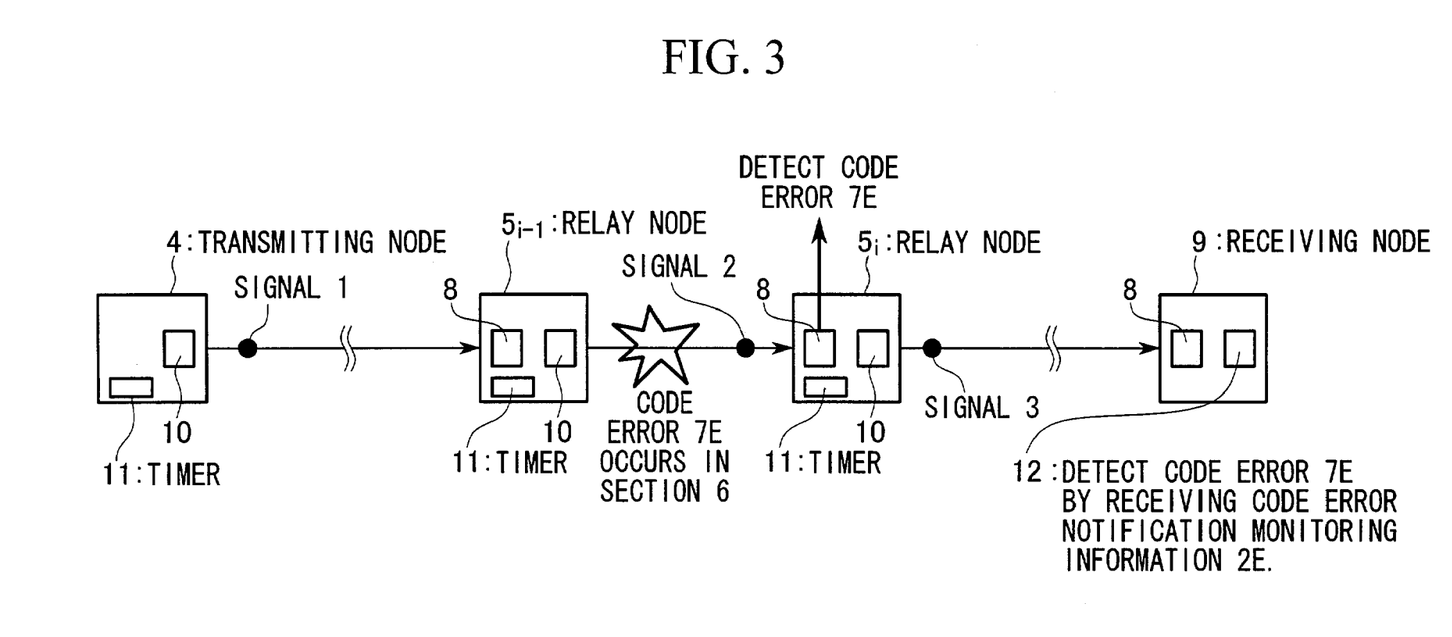
FIG. 3 is a block diagram of a monitoring method for a communication system according to a second embodiment of the present invention in which a code error occurs.

FIG. 3 is a block diagram of a communication system employing a monitoring method according to a second embodiment of the present invention. Hereinafter, the same reference numerals are applied to corresponding members as shown in FIGS. 1 and 10 so as to omit the repeated explanation thereof.

In the present embodiment, a monitoring information transmitting section 10 and a timer 11 are provided to a transmitting node 4.

The transmitting node 4 transmits the no disturbance notification monitoring information 2S of which idle code 1c is replaced to downstream regularly at every period of time T1.

Next, an operation in a case in which a code error 7E occurs in a section 6 between relay nodes $5_{i-1}$ to $5_i$ shown in FIG. 3 is explained with reference to FIG. 4.

When a relay node $5_i$ detects a 10B code 1d caused by a code error in a no disturbance notification monitoring information 2S in a signal 2 which is sent from a relay node $5_{i-1}$ in a measuring time T1, the relay node $5_i$ replaces the no disturbance notification monitoring information 2S by a code error notification monitoring information $2E_i$ after the time T1 passes, and transmits the code error notification monitoring information $2E_i$ as a signal 3 to downstream. In addition, each of the relay nodes can relay the code error notification monitoring information 2E which is transmitted by a relay node which is disposed upstream.

Figure 5:
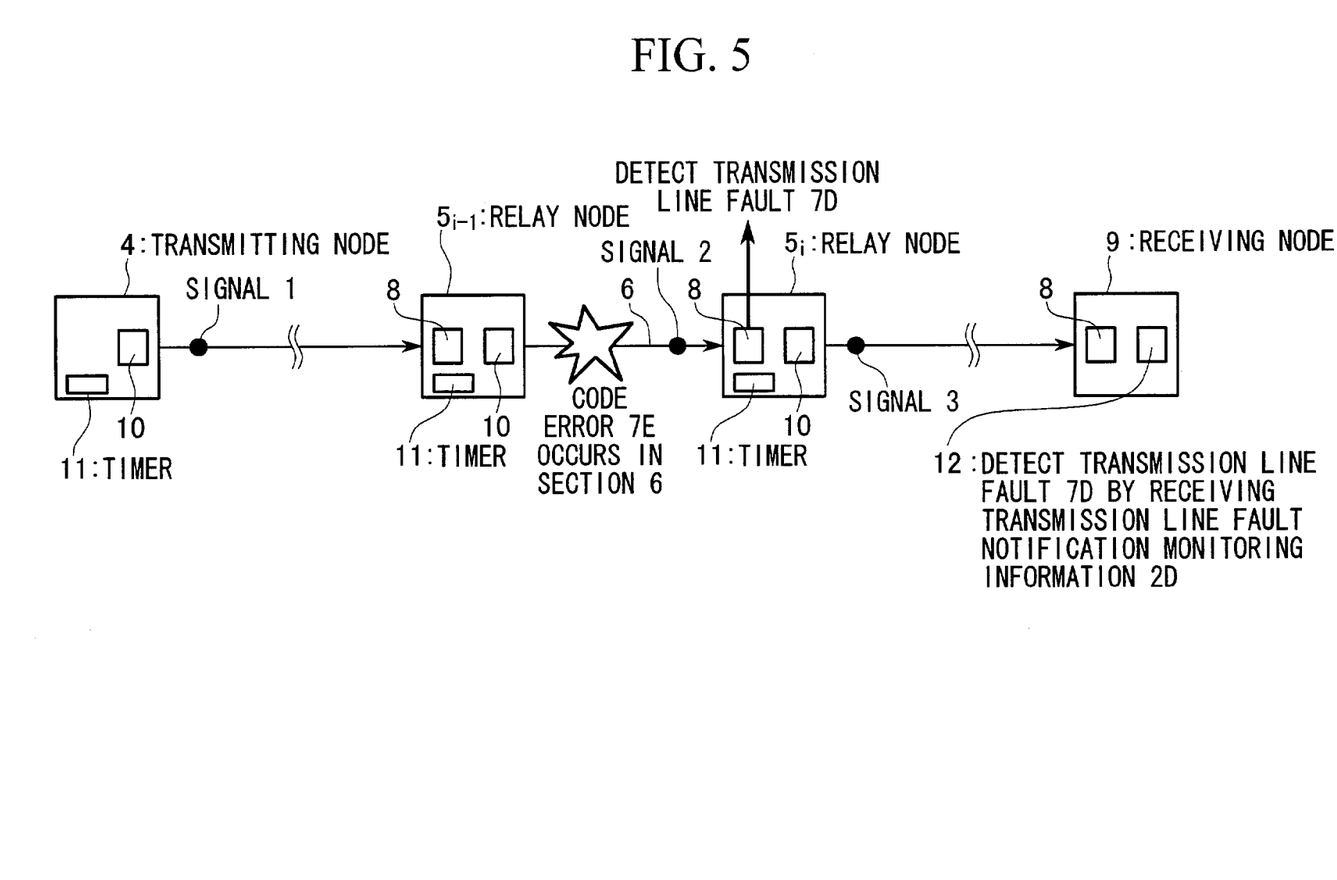
FIG. 5 is a block diagram of a monitoring method for a communication system according to a second embodiment of the present invention in which a transmission line fault occurs.

Next, an operation in a case in which a transmission line disturbance 7D occurs in a section 6 between relay nodes $5_{i-1}$ to $5_i$ shown in FIG. 5 is explained with reference to FIG. 6.

When the relay node $5_i$ detects the transmission line disturbance 7D in the signal 2, the relay node $5_i$ stops relaying all the monitoring information which are transmitted from upstream during the detecting time T1 and transmits a transmission line fault notification monitoring information 2D$i$ which indicates an occurrence of a transmission line fault at every period of time T1.

Figure 4:
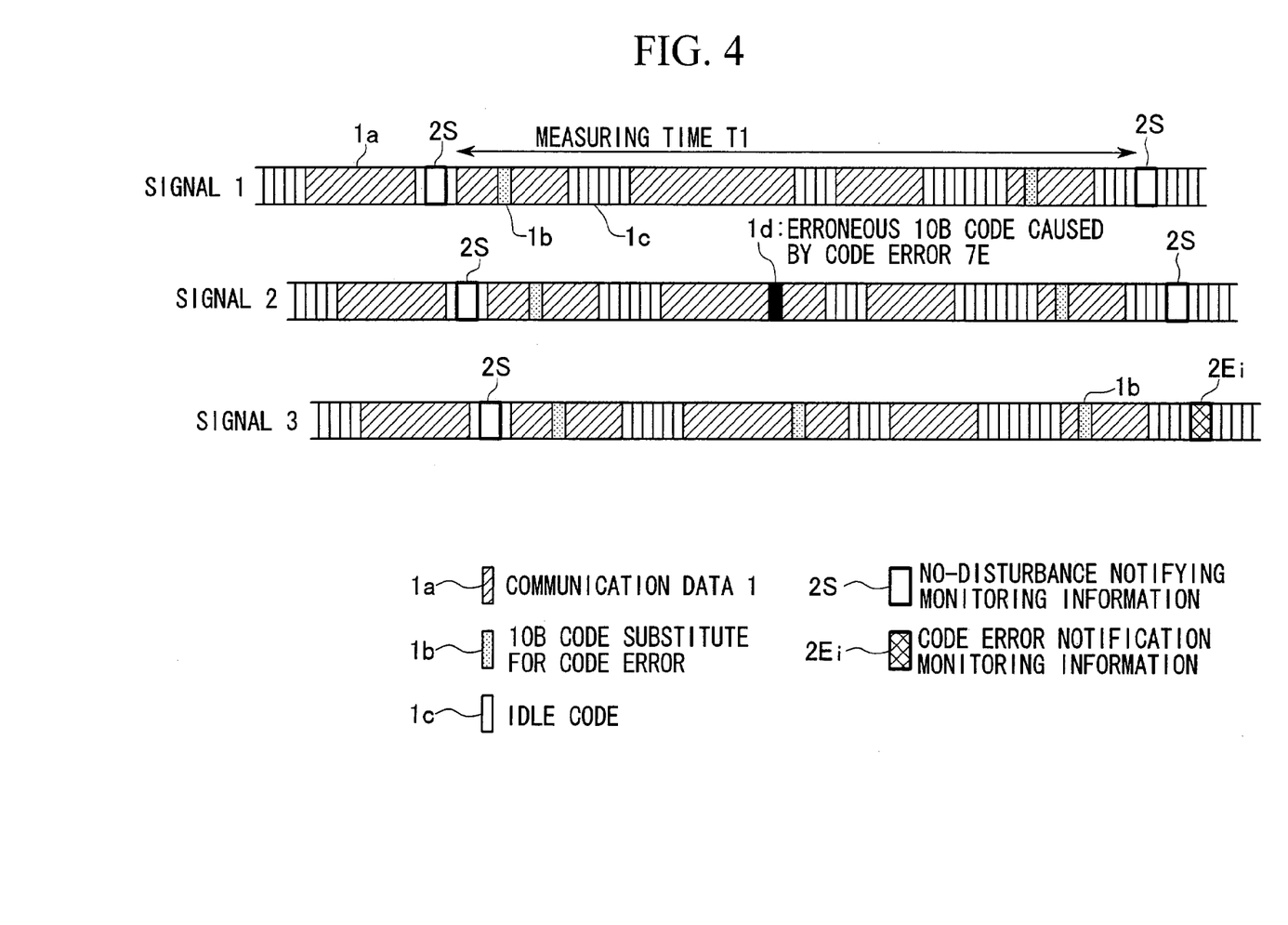
FIG. 4 is a timing chart showing an operation of a communication system to a code error by a monitoring method according to a second embodiment of the present invention monitoring method.
Figure 6:
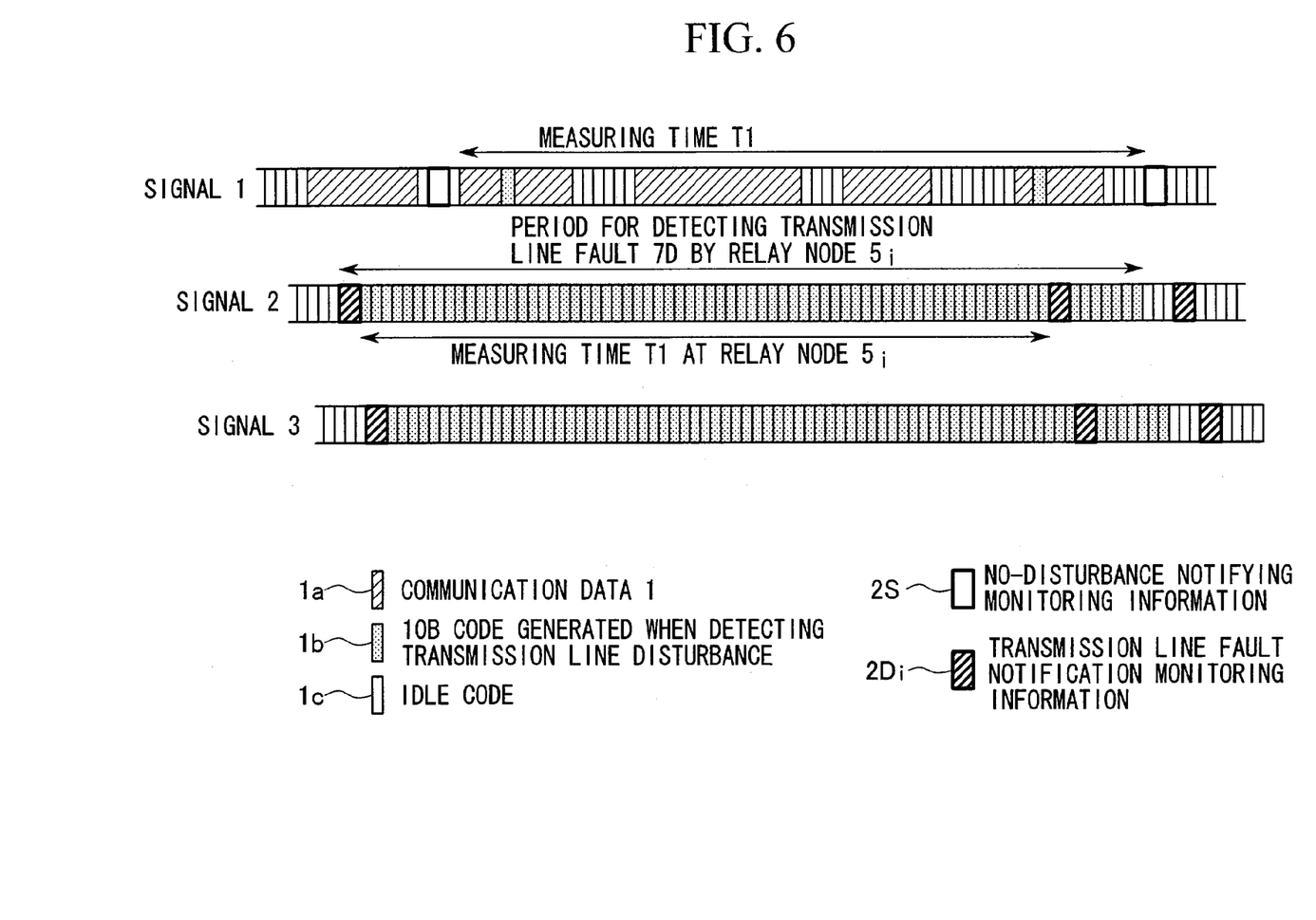
FIG. 6 is a timing chart showing an operation of a communication system to a transmission line fault by a monitoring method according to a second embodiment of the present invention monitoring method.

According to the present embodiment, it is possible to determine a condition of the code error and transmission line fault by investigating the signal 3 as shown in FIG. 4 and the signal 3 as shown in FIG. 6 in the receiving node 9.

According to the present embodiment, even if the number of the relay node increases, the transmitted amount of the monitoring information can be maintained at a constant level. Therefore, it is possible to realize a flexible communication system which does not have to limit the number of relay nodes instead of the communication system having a limit to the transmitted amount of the monitoring information.

In addition, in the first and the second embodiments, the code error notification monitoring information 2E can contain not only information indicating whether or not the code error occurs but also information such as the number of the code error which occurred during the previous transmission of the monitoring information and the current transmission of the monitoring information; therefore, it is possible to enhance the monitoring accuracy.

Also, by giving a number to each of the relay nodes and transmitting monitoring information containing information such as condition of the transmission line disturbance and information such as the number of the relay node which detects the disturbance, it is possible to specify which section a disturbance occurred at in the receiving node.

The present invention can be applied not only to a communication system having only one stage such a transmitting node and a receiving node but also to each stage in a communication system having multi-stage structure concurrently. For example, the present invention is applied to a communication system having a stage 1 and a stage 2, it is possible not only to monitor a transmission line disturbance which occurs in a section between the transmitting node and the receiving node in the stage 1 but also to monitor a transmission line disturbance which occurs in a section between the transmitting node and the receiving node in the stage 2.

As explained above, according to the present invention, it is possible to transmit information about an occurrence of a transmission line disturbance such as a code error and a transmission line fault which is detected at each relay node to the receiving node without an extra communication system in order to monitor a transmission line disturbance such as a code error and a transmission line fault for the purpose of maintaining the communication system in which a signal which indicates a code error and a transmission line fault which occur during the data transmission due to the existence of the relay node does not reach the receiving node.

As explained above, in the present invention, it is possible to provide a monitoring method for transmitting a monitoring information such as transmission line disturbance which occurs in a section between the transmitting node and the receiving node to the receiving node economically even via relay nodes.

Next, a third embodiment according to the present invention is explained as follows. In the third embodiment, the same frame structure as the fame of the currently-used synchronous communication system is virtually realized by unifying the control information and synchronizing the transmission speed of the control information in a communicating method which is different from the currently-used synchronous communication system. Under such conditions, it is possible to transmit and receive overhead information of the synchronous communication system using the frame at a frame frequency (virtual frame). By doing this, it is possible to realize a communication system having no difference from a operational point of view.

Figure 7:
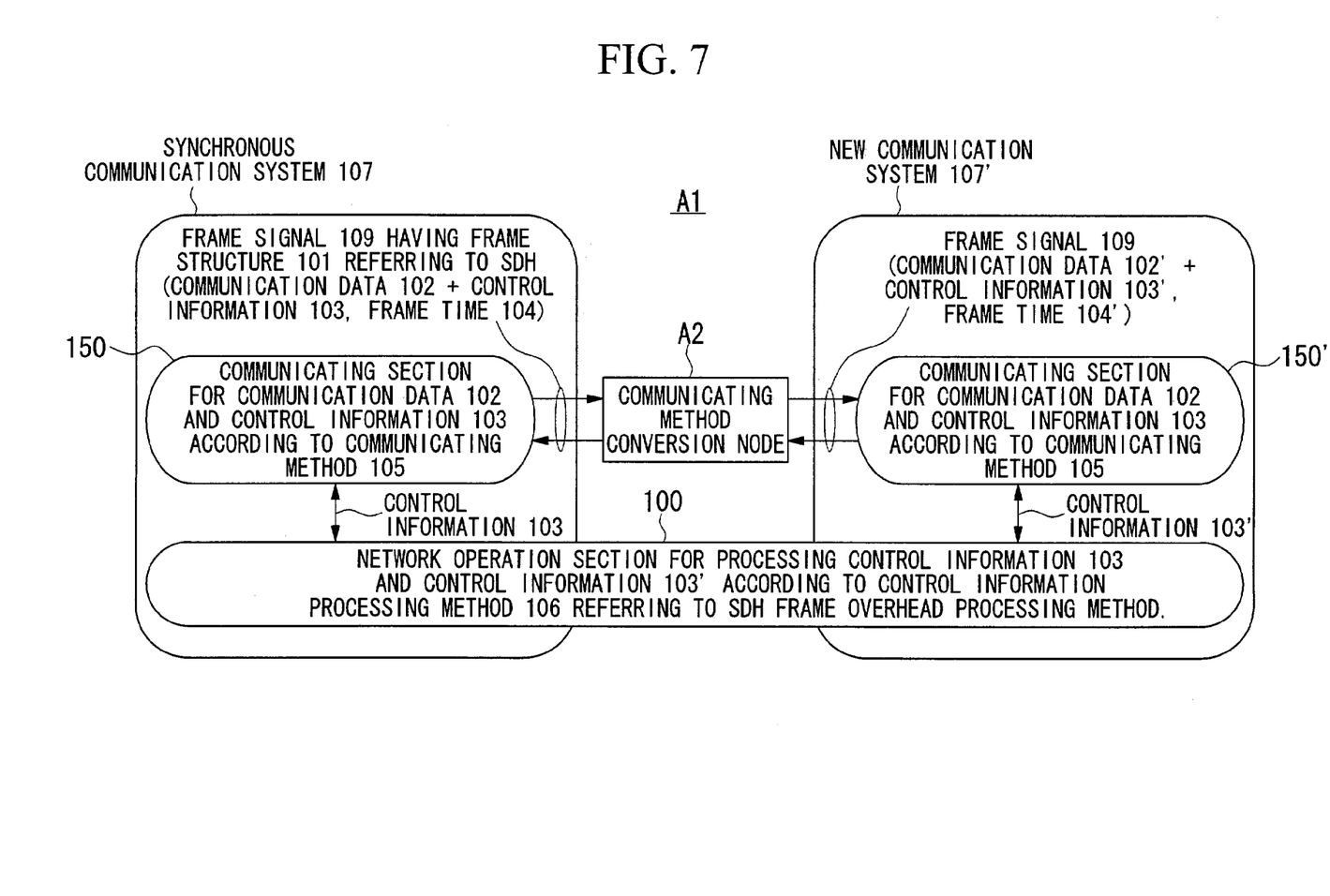
FIG. 7 is a block diagram showing an integrated network according to a third embodiment of the present invention.

FIG. 7 is a block diagram showing an integrated network A1 containing a currently-used synchronous communication system 107 and a new communication system 107' having a new protocol different from that of the synchronous communication system 107.

The integrated network A1 contains the synchronous communication system 107, the new communication system 107', and a communication method converting node A2 for connecting the above-mentioned systems.

Also, network operation sections 100 are provided to the synchronous communication system 107 and the new communication system 107' respectively. The network operation sections 100 processes the control information 103 and the control information 103' according to the control information processing method 106 which refers to an SDH frame overhead processing method which is mentioned later.

The synchronous communication system 107 transmits and receives the control information which is used for the purpose of maintenance of the communication data 102 and the communication system by using a communicating section 150 according to a synchronous frame communicating method 105 having an SDH frame.

Figure 8A:
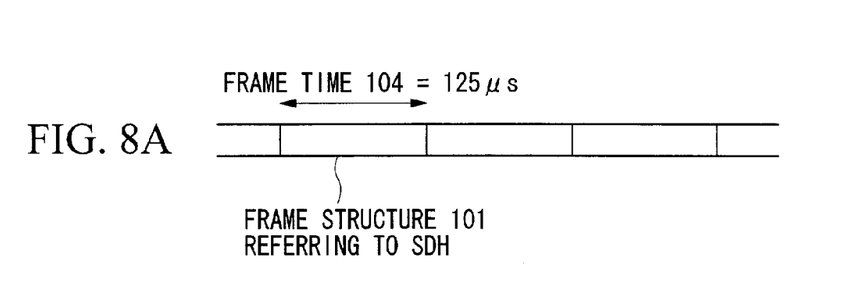
FIGS. 8A and 8B are views showing signals and frame structure of the synchronous communication system 107 employing Synchronous Digital Hierarchy (hereinafter called SDH) method as shown in FIG. 7.
Figure 8B:
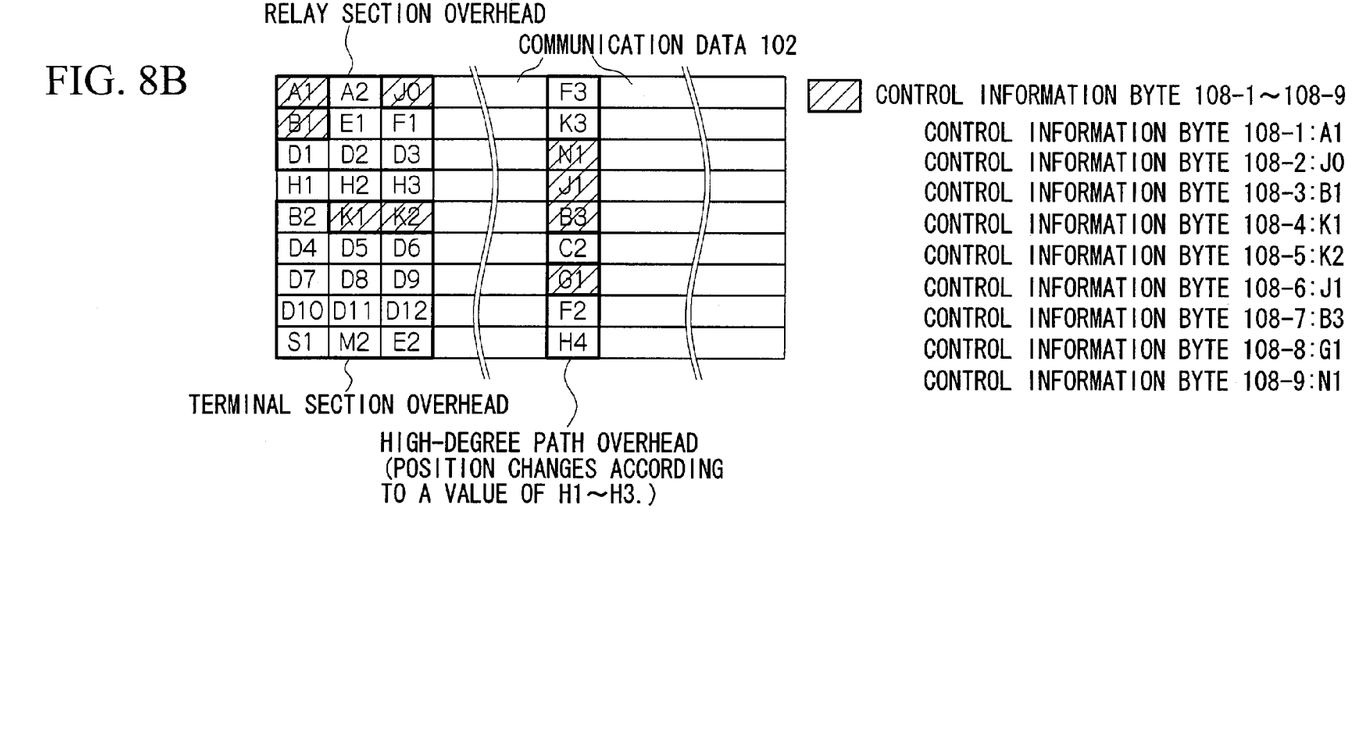

FIG. 8A shows a signal which is handled by a synchronous frame communicating method 105. FIG. 8B shows a frame structure in the synchronous frame communicating method 105.

As shown in FIG. 8A, in the synchronous frame communicating method 105, the communication data 102 and the control information 103 are transmitted and received with an interval of frame time 104 such as 125 μs continuously by using a frame having frame structure 101 which refers to the SDH.

As shown in FIG. 8B, the control information 103 contains the control information bytes 108-1 to 108-m (m is an integer) such as all or a portion of each byte of a regenerator section overhead, each byte of a multiplex section overhead, and a higher order path overhead. The control information processing method 106 performs a processing to the control information 103 which is used for the purpose of the maintenance. Also the control information processing method 106 refers to the SDH frame overhead processing method.

Figure 9:
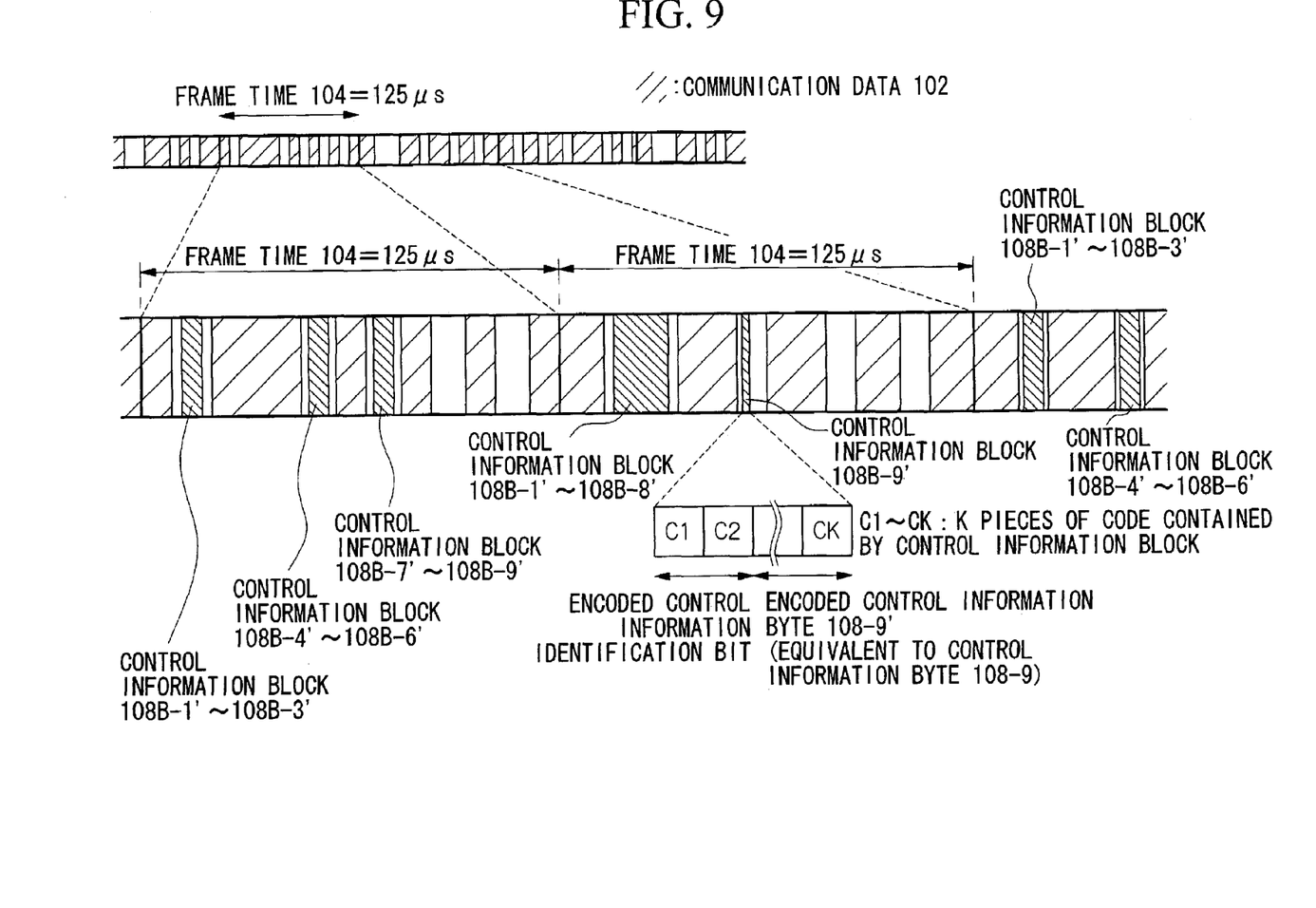
FIG. 9 is a timing chart showing an example of signals handled in a new communication system 107'.

FIG. 9 is an example of a timing chart showing a signal which is handled in the new communication system 107'.

The new communication system 107' transmits and receives the communication data 102' and the control information 103' such as m pieces of control information block 108-1' to 108-m' containing K (K is an integer) pieces of code per one block during 125 μs of frame time 104 according to a communication method 105' which is different from the synchronous frame communicating method 105 by using the communicating section 150'. The control information block 108B-i' (i is an integer from 1 to m) contains a code which indicates the control information byte 108-i' which is equivalent to the control information byte 108-i. Also, each block contains control information identification bits C1 and C2 containing one or a plurality of bit for specifying the identification of the control information byte which is included in each block.

For a transmission of the control information block 108B-i', the transmission of m pieces of control information block 108B-1' to 108B-m' is completed the frame time 104 (125 μs)

while the communication data 102' is not transmitted. After that, frame timing is generated at 125 µs, and the transmission starts from the control information block 108B-1' according to the above-mentioned timing. The transmission of the control information block which is equivalent to a next frame does not start during a period which is after the completion of the transmission of the control information block 108B-m' and before the next frame timing.

In the receipt of the control information block 108B-i', when the control information block containing a control information identification bit which indicates the control information block 108B-i' is detected, a frame timing is restored by removing a jitter component from the detected timing.

Also, when the control information identification bit in the received control information block indicates a control information byte 108-i', the control information byte 108-i' is obtained from the block. Among the control information block 108B-2' to 108B-m' which are supposed to be received, when a control information block 108B-j' is not received, it is determined that a code error occurs in the control information byte 108-j' during transmission; thus, a predetermined error processing is performed.

For a control information processing method for the control information byte 108-i' which is used for the purpose of maintaining the new communication system 107', the control information processing method 106 which is used in the synchronous communication system 107 is employed.

As explained above, in the new communication system 107' to which the communicating method according to the present invention is applied, the control information in the currently-used synchronous communication system 107 is unified, and the transmission speed of the control information is synchronous. Therefore, it is possible to realize a virtual frame which is equivalent to a frame in the currently-used synchronous communication system.

By doing this, it is possible to employ the control information processing method 106 in the currently-used synchronous communication system 107 to the new communication system 107' to which a communicating method according to the present invention is applied without change.

Also, in the integrated network in which the currently-used synchronous communication system 107 and the new communication system 107' to which the communicating method according to the present invention is applied are unified, it is possible to have a unified control information processing method 106. Thus, it is possible to realize an operation of the integrated network which is equivalent to a case in which only the currently used synchronous communication system 107 is used.

Also, the present embodiment is preferable for a packet communication such as on an Ethernet.

Here, in a transmission of the control information 103' in the new communication system 107', among m pieces of the control information blocks 108B-1' to 108B-M', it is possible not to transmit a control information block 108B-i which coincides a default value. In such a case, when the control information 103' is received, it is determined that the control information block 108B-i' was not received at a predetermined time. When the receipt of the control information 103' is detected, the processing is performed similar to the case in which the control information block 108B-i' which coincides with the default value is received.

Also, the present invention can be applied not only to the currently-used synchronous communication system 107 such as SDH but also to other communication system in which synchronous communication is performed using a synchronous optical network (hereinafter called SONET) or other frames.

Next, an example of a wide area network (hereinafter called WAN) to which the present invention is applied as a Giga bit Ethernet or a 10 Giga bit Ethernet is explained as follows. In the following example, a maintenance monitoring information is embedded in an inter-packet gap (hereinafter called IPG). Accordingly, a maintenance monitoring information which is compatible with SONET is introduced to the Giga bit Ethernet and 10 Giga bit Ethernet.

In SONET and SDH, the maintenance monitoring information is handled by using a control information byte which is included in an overhead of the frame. An operation system realizes reliable maintenance monitoring operation by using the maintenance monitoring information. In the above-mentioned applied technique, maintenance monitoring information which is compatible with SONET is introduced to the Giga bit Ethernet and 10 Giga bit Ethernet; thus, a virtual SONET is realized.

In the above-mentioned virtual SONET, information which is equivalent to an overhead of the SONET is communicated with 125 µs of frame frequency. A transmitting section replaces at least a portion of idle which is transmitted during the IPG period by the control information block (hereinafter called a virtual SONET order set) containing four codes which are defined for the use in the virtual SONET. Basically, the virtual SONET ordered set and the SONET control information byte correspond in one-by-one relationship and contain control information which are equivalent to an ID (identification information) of the SONET control information and SONET control information byte. Here, a virtual SONET ordered set which corresponds to the SONET control information byte (synchronizing byte, pointer byte, etc.) which is not necessary for the Gigabit Ethernet and 10 Gigabit Ethernet is not defined. A receiving section receives the virtual SONET ordered set and reads the contained control information. The same bandwidth as that in the SONET overhead is obtained by transmitting the virtual SONET order set which corresponds to the SONET control information byte which is supposed to be transmitted in the 125 µs which is the same as the SONET frame frequency. A virtual SONET order set which indicates a frame per every 125 µs is defined as |r|. The |r| is transmitted within 14 µs from the frame boundary timing.

Next, an example of code combination of the virtual SONET order set is shown as follows. Various code combination can be proposed, and one example is a virtual SONET order set which contains four codes such as [Og: d1: d2: b]. Here, "Og" in the top of the combination is a specific code which indicates a virtual SONET ordered set. The "d1" is an ID which relates to a domain such as section, line, or a path. "d2" is also an ID which relates to functions such as an alarm, trace, and parity. The "b" is a control information which is equivalent to the SONET control information byte. For the |r| which indicates an order set indicating the above-mentioned frame boundary, order sets containing "d1" and "d2" which are zero are allocated.

The control information byte is fixed in the SONET frame. In contrast, the location of the above-mentioned virtual SONET order set (not including "|r|") is flexible in a virtual frame which is indicated by the frame boundary order set |r|.

By the above-mentioned application of the present invention, it is possible to manage the Gigabit Ethernet and 10 Gigabit Ethernet by an operation system which is operated by SONET and SDH in an integral manner.

By doing this, the following advantages are obtained in the present invention.

1). It is not necessary to develop a new operating system.
2). It is easy to introduce a reliable monitoring function for a SONET and SDH.
3). The monitoring function fits the WDM and SONET.

As shown above, the present invention has superior effects such as reducing the cost for developing a new operating system by utilizing a control information processing method without change which is employed in the currently used synchronous communication system and a seamless network operation in the integrated network containing the currently used synchronous communication system.

The invention claimed is:

1. A communicating method for a communication system, the communication method comprising:

communicating from a first communication system having a first synchronous protocol to a second communication system having a second synchronous protocol different from the first synchronous protocol, a first frame signal having a first communication data and a first control information in an SDH frame structure, through a first communication section in the first communication system, wherein the communicating is in a 125 µs frame time interval;

communicating from the second communication system to the first communication system, a second frame signal having a second communication data and a second control information in another SDH frame structure through a second communication section in the second communication system, wherein the communicating is in a 125 µs frame time interval; and processing the first control information and the second control information according to a control information processing method based on an SDH frame overhead processing method, wherein each of the first control information and the second control information includes control information bytes including a relay section overhead, a terminal section overhead, and a high-degree path overhead.

2. A communicating method according to claim 1 wherein;

the first control information contains control information bytes such as all or a portion of each byte of a regenerator section overhead, each byte of a multiplex section head, and a higher order path overhead; transmitting and receiving the communication data and the second control information which may contain more information than the first control information in 125 µs of frame time is possible by the second communicating method; and the second control information containing a control information byte that is transmitted and received in 125 µs.

3. A communication method according to claim 1 wherein the control information bytes include a plurality of control information blocks and a control information identification bits, and each control information block includes a code.

4. A communicating system comprising:

a first communication system having a first synchronous protocol for communicating to a second communication system having a second synchronous protocol different from the first synchronous protocol, a first frame signal having a first communication data and a first control information in an SDH frame structure, through a first communication section in said first communication system, wherein the communicating is in a 125 µs frame time interval;

said second communication system having means for communicating to said first communication system, a second frame signal having a second communication data and a second control information in another SDH frame structure through a second communication section in said second communication system, wherein the communicating is in a 125 µs frame time interval; and means for processing the first control information and the second control information according to a control information processing method based on an SDH frame overhead processing method, wherein each of the first control information and the second control information includes control information bytes including a relay section overhead, a terminal section overhead, and a high-degree path overhead.

5. A monitoring method for a communication system for relaying signals which are transmitted from a transmitting node by one or more relay nodes successively and receiving thereof by a receiving node, comprising:

adding at each of the relay nodes first monitoring information which indicates no disturbance or second monitoring information which indicates an occurrence of transmission line disturbance in the received signals while replacing a portion of idle codes, produced in a period in which communication data is not transmitted in the signal, with monitoring information based on the results of monitoring the transmission line disturbance at a predetermined time interval and transmits the results downstream;

transmitting by each of the relay nodes the second monitoring information when transmission line disturbance is detected during a period between previous transmission and a current transmission of the monitoring information;

transmitting by each of the relay nodes the first monitoring information when transmission line disturbance is not detected between monitoring information which was transmitted previously and monitoring information which is supposed to be transmitted; and wherein the monitoring information contains a condition of the transmission line disturbance and a relay node number which is given to each of the relay nodes.

6. A monitoring method for a communication system for relaying signals which are sent from a transmitting node by one or more relay nodes successively and receiving thereof by a receiving node, comprising:

adding at a transmitting node monitoring information which indicates no disturbance to a signal which is supposed to be sent while replacing a portion of idle codes, produced in a period in which communication data are not transmitted in the signal, with monitoring information at a predetermined first time interval and transmits the monitoring information;

stopping the relaying by each of the relay nodes all monitoring information that is received during a second time interval in which each node is detecting the transmission line defect while replacing it with a portion of idle codes during the second time interval and adds the monitoring information which indicates the occurrence of the transmission line defect and transmits it downstream;

each of the relay nodes replacing the monitoring information which is received after the relay node detects the code error and indicates no disturbance with monitoring information which indicates a code error and transmits it the downstream; and wherein the monitoring information contains a condition of the transmission line disturbance and a relay node number which is given to each of the relay nodes.

7. A relay node apparatus for a communication system for relaying signals which are sent from a transmitting node by one or more relay nodes successively and receiving it by a receiving node, wherein:

a transmitting node adds monitoring information which indicates no disturbance to a signal which is supposed to be sent while replacing a portion of idle codes, produced in a period in which communication data are not transmitted in the signal, with monitoring information at a predetermined first time interval and transmits the monitoring information;

each of the relay nodes stops relaying all monitoring information that is received during a second time interval in which the each node is detecting the transmission line defect while replacing it with a portion of idle codes during the second time interval and adds the monitoring information which indicates the occurrence of the transmission line fault and transmits it downstream;

each of the relay nodes replaces the monitoring information which is received after the relay node detects the code error and indicates no disturbance with monitoring information which indicates a code error and transmits it downstream; and the monitoring information contains a condition of the transmission line disturbance and a relay node number which is given to each of the relay nodes.

8. A relay node apparatus for a communication system for relaying signals which are sent from a transmitting node by one or more relay nodes successively and receiving it by a receiving node, wherein:

a transmitting node adds monitoring information which indicates no disturbance to a signal which is supposed to be sent while replacing a portion of idle codes, produced in a period in which communication data are not transmitted in the signal, with monitoring information at a predetermined first time interval and transmits the monitoring information;

each of the relay nodes stops relaying all monitoring information that is received during a second time interval in which the each node is detecting the transmission line defect while replacing it with a portion of idle codes during the second time interval and adds the monitoring information which indicates the occurrence of the transmission line fault and transmits it downstream;

each of the relay nodes replaces the monitoring information which is received after the relay node detects the code error and indicates no disturbance with monitoring information which indicates a code error and transmits it downstream; and the monitoring information contains a condition of the transmission line disturbance and a relay node number which is given to each of the relay nodes.

* * * * *